United States Patent [19]
Stephens

[11] Patent Number: 5,365,646
[45] Date of Patent: Nov. 22, 1994

[54] METHOD OF MANUFACTURING AN ELONGATED SPRING MEMBER

[75] Inventor: Donald L. Stephens, Skagit, Wash.

[73] Assignee: Paccar Inc., Bellevue, Wash.

[21] Appl. No.: 36,468

[22] Filed: Mar. 24, 1993

Related U.S. Application Data

[62] Division of Ser. No. 761,488, Sep. 18, 1991, abandoned.

[51] Int. Cl.$^5$ ............................................. B23P 13/00
[52] U.S. Cl. ......................................... 29/173; 267/47
[58] Field of Search ..................... 29/173; 219/121.38, 219/121.39, 121.44; 267/47, 260

[56] References Cited

U.S. PATENT DOCUMENTS

| | | | |
|---|---|---|---|
| 1,650,941 | 11/1927 | Hopkins | 29/173 |
| 1,734,008 | 10/1929 | Frehse | 29/173 |
| 2,608,752 | 9/1952 | Schilling | 29/173 |
| 3,238,072 | 3/1966 | Greene et al. | 29/173 |
| 3,441,999 | 5/1969 | Perdue et al. | 29/173 |
| 3,516,874 | 6/1970 | Maker et al. | 29/173 |
| 3,671,030 | 6/1972 | Marion | 29/173 |
| 4,054,278 | 10/1977 | Bilobran | 29/173 |

*Primary Examiner*—P. W. Echols
*Attorney, Agent, or Firm*—Seed and Berry

[57] ABSTRACT

A compact suspension system for a wheeled vehicle and method for its manufacture. The suspension includes a tapered, vertically mounted elongated arm having an integral eye at one end. The integral eye rotatably connects the elongated arm to the vehicle while the other end connects to an air spring attached to the vehicle. The axle connects to the arm near the air spring. The arm is tapered between the axle and the integral eye so that the amount of arm material, and thus weight, is reduced. A second arm is placed adjacent to, and parallel with, the first arm to back up the first arm if the first arm fails, or vice versa. A shock absorber is mounted near the axle on the opposite side of the axle as the air spring. The method of manufacture includes plasma cutting a blank elongated arm from spring steel, heat-treating the arm, machining to final form, and then shot peening the arm.

14 Claims, 3 Drawing Sheets

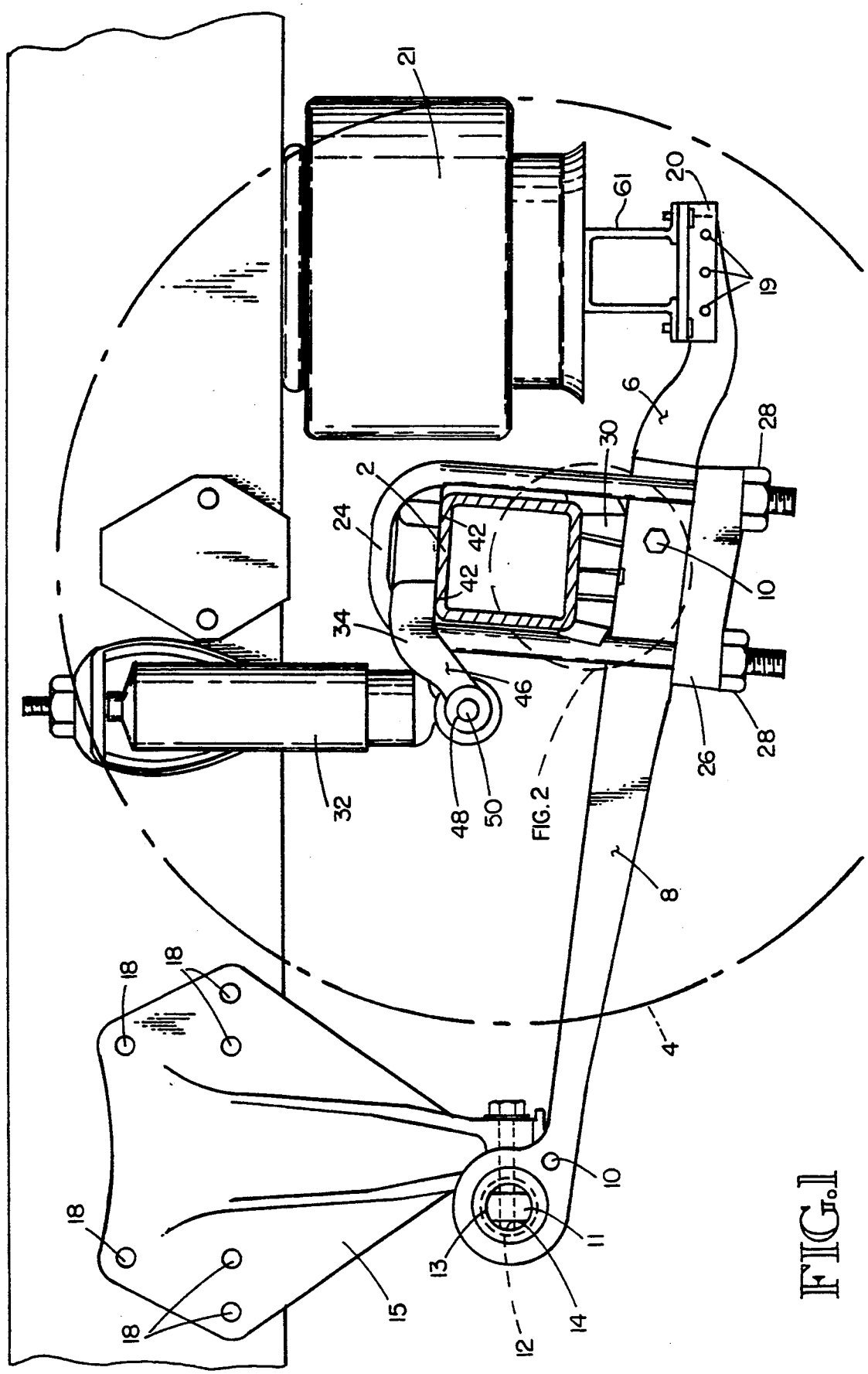

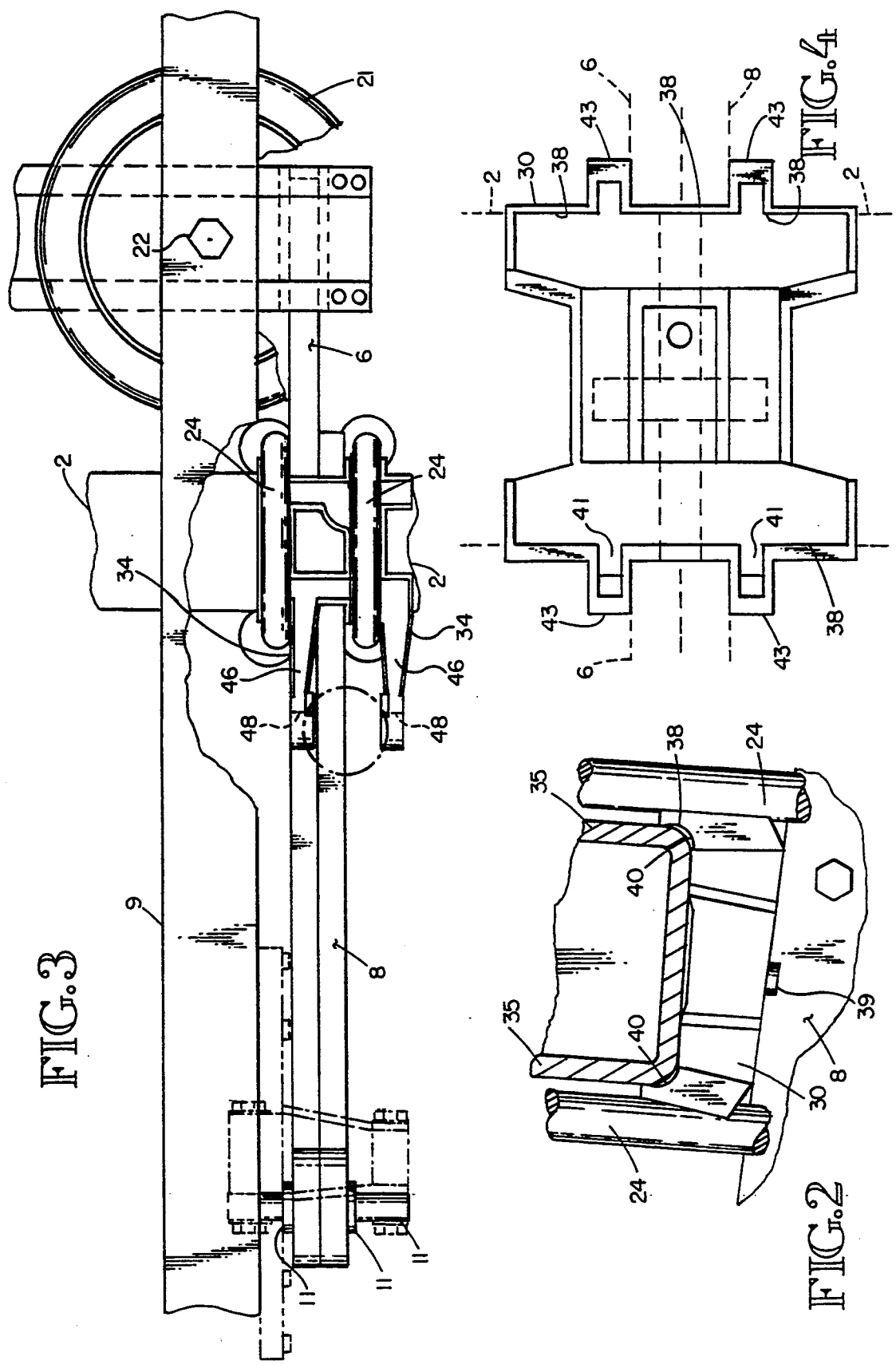

METHOD OF MANUFACTURING AN ELONGATED SPRING MEMBER

CROSS REFERENCE TO RELATION APPLICATION

This application is a division of U.S. patent application Ser. No. 07/761,488, filed Sep. 18, 1991, now abandoned.

TECHNICAL FIELD

This invention relates to wheeled vehicle suspension systems. More particularly, it relates to a lightweight wheeled-vehicle suspension system.

BACKGROUND OF THE INVENTION

Vehicle operators usually prefer to drive a vehicle having a soft, smooth ride with predictable handling characteristics. These features are particularly desirable in long-haul trucks where an operator may drive a heavily loaded truck continuously for many hours.

One type of variable-stiffness suspension system frequently used with trucks incorporates leaf springs, shock absorbers, and air springs. Typical systems of this type are taught in U.S. Pat. No. 3,802,718, to Schaeff, and U.S. Pat. No. 4,946,190, to Buttner. Generally, in these systems the air springs and shock absorbers absorb the suspension forces from vertical motions while the leaf springs allow the wheels to negotiate individual bumps affecting one wheel.

While the leaf spring, shock absorber, and air spring suspension systems are generally successful, they tend to be heavy. Not only do heavy suspension systems reduce fuel economy, but since the legally permissible weight of a vehicle on most highways is limited the weight of the suspension system directly reduces the weight of material the vehicle can carry. Lighter suspensions tend to be less expensive to construct, as well. Therefore, a lighter-weight suspension system is beneficial.

A major contributor to the weight of a typical suspension system is the leaf springs. Leaf springs are usually composed of stacked sections of long, flat pieces of spring steel that are much wider than they are tall. The bending strength of a leaf spring, which is nearly rectangular in cross section, is measured by a quantity called the section modulus. The leaf spring rectangular cross section modulus is given by the formula:

$$Z = A(d)/6$$

wherein Z is the section modulus (in cubic inches), A is the cross-sectional area of the leaf spring, and d is the leaf spring vertical depth. For a given area, A, the leaf spring is therefore stronger when oriented so that the depth, d, is larger than the width. This is similar to using a deep vertical but horizontally narrow beam as a wood joist or rafter in home construction. Vertically oriented elongated elements are taught in U.S. Pat. Nos. 4,310,171 and 4,541,653. However, those vertically oriented, elongated spring members are rigid rather than springy and are made of common beam material to provide the strength, thereby adding weight. The rigidity of such a beam does not allow the suspension to accommodate individual bumps.

Leaf springs are usually formed with a wrapped "eye" at each end to assist attachment of the leaf spring to the vehicle. Leaf springs with wrapped eyes tend to be weak at the wrap and subject to fatigue-induced failures. Therefore, wrapped-eye leaf springs usually incorporate a backup leaf loosely wrapped around the main leaf in case the main leaf spring fails. While this construction, termed a "military wrap," provides safety, it increases the overall suspension system weight. Additionally, only one eye at a time can support fore and aft load, so the combined strength of two eyes (the wrapped eye and the military wrap) is not available.

One way of reducing the weight of the suspension system is to make the suspension of compact structural parts. Compactness was limited in most prior art suspension systems because the leaf springs are usually dimensioned to have the axle attach at their midpoints, as illustrated by U.S. Pat. No. 3,309,107, or they include additional materials to achieve desired geometries, as in U.S. Pat. No. 4,946,190. Besides a weight reduction advantage, compact suspension parts are able to better utilize the suspension components. This follows because as the available system components are brought closer together, the moment arms of the components, and hence weight, are reduced.

Therefore, there has existed a need for a lightweight, compact suspension system for a wheeled vehicle.

SUMMARY OF THE INVENTION

It is an object of this invention to provide a lightweight air-spring suspension system for a wheeled vehicle.

It is another object of the present invention to provide a compact suspension system for a wheeled vehicle.

Another object of this invention is to provide a vehicle suspension system without a wrapped leaf spring eye.

Another object of the invention is to provide a unique spring arm for a vehicle suspension.

These and other objects of the invention are accomplished in a wheeled-vehicle suspension system having a vertically oriented, elongated spring member that is rotatably connected at one end using an integral eye, or hole, disposed through the elongated spring member. The other end of the elongated spring member attaches to an air spring that, in turn, is attached to the vehicle. The vehicle axle connects to the elongated spring member between the two ends, preferably near the air spring. The elongated spring member itself is tapered between the axle and the integral eye to provide flexibility while reducing weight. A shock absorber is mounted near the axle on the side of the axle opposite the air spring.

According to the preferred embodiment, a second elongated spring member is disposed adjacent to, and parallel with, the first elongated spring member. These two elongated spring members provide protection if either elongated spring member fails. Substantially similar suspension systems are used on each side of the vehicle, thus an anti-sway bar composed of the axle and the elongated spring members is formed.

Both of the elongated spring members are preferably manufactured from a blank of suitable material, about one inch thick, spring steel such as AlSl 5160. A rough, or base, elongated spring member is cut from this blank using plasma arc cutting techniques, with all cutting performed under water. An opening which will become the integral eye is also burnt out at this time. The base elongated spring member is then heat treated by soaking it at high temperature to remove stresses induced during cutting. The base is then tampered by heating, quenching, and tempering. The heat-treated base elongated spring member is then machined to its final form. Machining includes the steps of boring out the integral eye using a sharpened, carbide bit, breaking all sharp edges, and blending the machined areas of the elongated spring member to the non-machined areas to avoid abrupt material structural changes. All cuts in the machining process are preferably performed along the linear axis of the elongated spring members to impart favorable residual stresses to the cut surfaces. After machining, the elongated spring members are shot-peened using hard steel balls, except for the inner diameter of the integral eye, which is protected from peening.

The novel features and the advantages of the present invention, as well as other objects thereof, will be understood more fully after reading the following detailed description and after reference is made to the accompanying drawings.

BRIEF DESCRIPTION OF THE DRAWINGS

FIG. 1 is an elevational view of the preferred embodiment of the present invention.

FIG. 2 is a partial plan view of the embodiment of FIG. 1.

FIG. 3 is an expanded view of FIG. 1 showing the spring seat disposed between the axle, the elongated spring members, and the U-bolt.

FIG. 4 is a plan view of the spring seat.

DETAILED DESCRIPTION OF THE INVENTION

Figure 5:
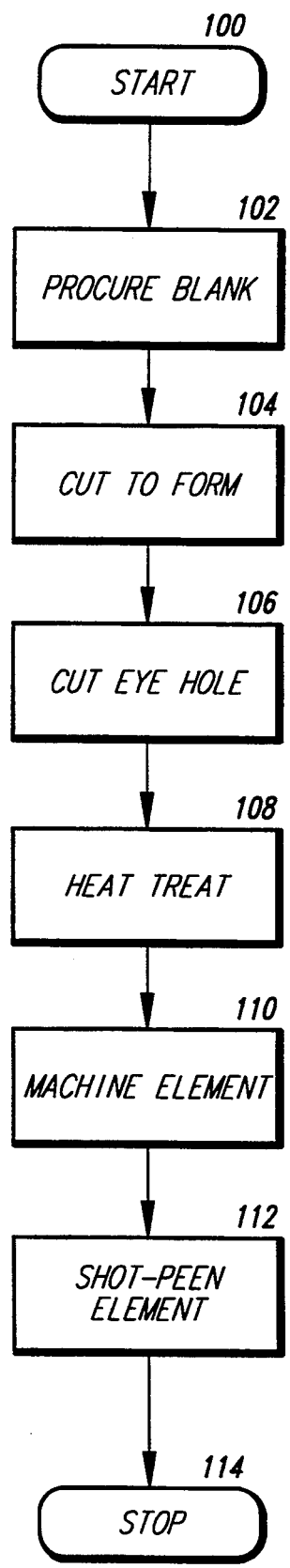
FIG. 5 is a flow diagram illustrating the process of manufacturing the elongated spring members.

Referring to FIG. 1, the preferred embodiment lightweight suspension system is intended for use on a wheeled vehicle having an axle 2 connected to a rubber-tire 4 on each side of the vehicle. While FIG. 1 shows the system components located on the left side of the vehicle, it is to be understood that a similar system is located on the opposite side and that both sides' components are connected together by the axle 2.

Referring now to both FIGS. 1 and 2, a first elongated spring member or arm 6 and an adjacent, second elongated spring member or arm 8 connect the axle to the vehicle chassis 9. The preferred embodiment suspension systems also includes a conventional tracking rod (not shown) connected between the chassis and the axle that is used to transfer lateral forces between the chassis and the axle. Use of the tracking rod relieves the remainder of the suspension system from having to handle large lateral loads as is well known.

In practice, the elongated spring members are connected together to form a single unit by fasteners 10 inserted through holes drilled through the elongated spring members. At their front ends, the first elongated spring member 6 and the second elongated spring member 8 are rotatably attached to a pivot pin 11 via an elastomeric bushing 12 which may have an inner metal retainer 13. The bushing 12 is pressed into integral eyes 14 formed through the elongated spring members. The integral eyes may be formed through the elongated spring members by cutting or drilling, but can be partially formed by burning. This permits plasma arc techniques to be used to form the integral eyes, as subsequently explained. The integral eyes result in a stronger eye than those formed by wrapping, or wrapping and welding.

The pivot pin 11 and the bushing 12 permit the first elongated spring members to rotate in a vertical plane about the pivot pin 11. The pivot pin 11 is fixed to the vehicle chassis 9 by way of a pivot mount 15 attached to a vehicle chassis. In one preferred embodiment, the pivot mount is held in place by bolts 18.

As is best shown in FIG. 1, the rear end or extension of the first elongated spring member 6 is connected by bolts 19 to an inverted U-shaped bracket 20 bolted to a transverse beam 61. The beam 61 connects in a similar manner to the corresponding spring member on the opposite side of the suspension. Air spring 21 is connected to the beam 61 and to the chassis 9 in a conventional manner.

The pivot pin 11, air spring 21, and axle 2 are interconnected such that the axle attaches to the elongated spring members 6 and 8 much closer to the air spring than the pivot pin. In particular, as shown in FIG. 1, the air spring connects to the elongated spring members as near the axle as feasible. This reduces the overall suspension system weight by reducing the length of the first elongated spring member between the axle and air spring. Additionally, because of the short distance between the air spring and axle, the range of motion required at the air spring for proper operations is reduced, and the spring rate of the suspension is reduced.

Referring to FIGS. 1 and 2, the axle connects to the elongated spring members 6 and 8 using two conventional U-bolts 24, one adjacent the second elongated spring member and the other adjacent the first elongated spring member. A single piece retainer plate 26 and four (4) nuts 28 hold the U-bolts in place. A spring seat 30 is disposed between the axle and the elongated spring members 6 and 8. Additionally, as is best shown in FIG. 1, the preferred embodiment includes a shock absorber 32 located near the axle and connected to the axle by a support arm 34.

The preferred embodiment lightweight suspension system utilizes a thin-walled axle. Because the first and second elongated spring members are relatively narrow, about one (1) inch apiece, and because the forces placed on the axle are large, the thin walls of the axle might buckle if the axle were mounted directly across the elongated spring members. Referring now to FIG. 3, the spring seat 30 disposed between the elongated spring members, the axle, and the U-bolts distribute forces applied to the bottom of the axle along the axle through its sidewalls 35. As is shown in FIGS. 2 and 4, the spring seat includes an axle guide 38, about 4 inches long in the preferred embodiment, having a curved surface 40 and walls 41 which contact the axle and direct the forces through the axle's sidewalls 35. The spring seat also includes a bottom elongated spring member guide 39 for mating with the elongated spring members. Since the spring seat is essentially a thick steel casting, it can easily withstand the forces placed on it by the elongated spring members and the axle.

Referring now to FIGS. 1 and 3, the support arm 34 distributes forces applied to the top of the axle across the axle 2 in a manner similar to the spring seat. The surface of the axle 2 contacts the bottom surface 42 of the support arm. The support arm distributes forces over an area on the axle top wall. The U-bolts wrap over the support arm 34, straddle the spring seat and elongated members and connect to the retainer plate 26 via the nuts 28.

The support arm also has integral arm members 46 which extend beyond the U-bolts. Disposed through the integral arm members in a direction substantially parallel to the axle are holes 48. The support arm connects to the shock absorber, which has an eye on the lower end of its arm, by placing the shock absorber eye in a position axially aligned with the eye of the integral arms and passing a retainer bolt 50 (shown in FIG. 1) through the eyes of the integral arms and the shock absorber eye. The shock absorber used in the preferred embodiment is a 1.625-inch diameter cylindrical shock absorber. The shock absorber eye through which the bolt 50 passes is a bushing comprised of a metal retainer ring placed within a rubber mount connected to the shock absorber.

Still referring to FIG. 1, the shock absorber is located near the axle on the side opposite the air spring. This orientation assists in forming a compact suspension system by locating suspension components near each other. Additionally, this orientation assists locating the centers of the pivot pin 11 and axle on the same horizontal plane during quiescent conditions. Having those centers on the same plane improves the vehicle's handling.

Referring now to FIGS. 1 and 2, the elongated spring members 6 and 8 are partially tapered between the pivot pin 11 and the axle 2 while only the elongated spring member 8 extends a short distance past the axle 2 toward the air spring. This feature further reduces the weight of the inventive suspension system by eliminating unneeded material. By tapering the first and second elongated spring members, the elongated spring members can act as a stiff beam where stiffness is needed, such as near the axle and between the axle and the air spring, while retaining a flexible spring action where desired, such as between the pivot pin 11 and the axle. By adjusting the taper and the length of the spring, a spring rate can be created that allows the vehicle's wheels to maintain reasonable contact with the ground while providing roll stiffness. Factors that influence the taper of the elongated spring members include the location of the axle 2 relative to the pivot pin 11, the material from which the elongated spring members are constructed, the maximum weight to be supported, and the amount of spring action desired in the elongated spring members.

The first elongated spring member 6 and the second elongated spring member 8 are preferably manufactured according to the process shown in the flow diagram of FIG. 5. The manufacturing process begins with the procurement of a blank piece of stock material, steps 100 and 102. The preferred material is about one-inch thick, 5160, or other, spring steel having a yield strength after heat treatment of approximately 180,000 PSI. A rough elongated spring member, hereinafter called a "base," is cut from the procured blank using a plasma arc torch using oxygen plasma gas, step 104. To avoid excessive heat effects, the plasma cutting process is performed under water using the manufacturer's recommended settings. The base elongated spring member is cut in the form of the desired finished product, except that it is dimensioned slightly larger so that machining steps, which remove material, can be performed on the base to produce the final product. A hole is cut through the base elongated metal which, after machining, will become an integral eye 13, step 106. In the preferred embodiment, the finished, machined integral eye is approximately a 2.6965-inch diameter circle while the base integral eye is plasma cut to a 2.17-inch radius.

After the integral eye is partially formed in the base elongated spring member, the spring member is heat treated, step block 108, by raising its temperature slowly to approximately 1200° F. and soaking it there for one hour. After this one-hour high-temperature soak, which is performed to relieve stress before additional heat treatment, the base elongated spring member is heated, quenched, and tempered to a Brinell hardness range of BHN 401–461. The quenching process is performed so that subsequent straightening results in a residual compression along the top edge of the leaf. The part is next tempered by heating to about 875° F. The final step in the heat treatment process is to straighten the elongated spring member slightly to its desired shape.

After heat treatment, the base elongated spring member is machined to its final form, step 110. Since in the preferred embodiment the first elongated spring member 6 and the second elongated spring member 8 are joined together in two places using fasteners 9, machining includes the steps of drilling the required holes through the base elongated spring members using sharp carbide bits. The plasma-cut form is then machined into its final form. During machining, the machine-worked areas of the elongated spring members are blended with the non-machined areas to avoid abrupt structural changes. All machining is done along a direction parallel to the length of the elongated spring member. The integral eye 13 is also completed by drilling the eye using a properly sized, sharp carbide bit. Finally, all corners are broken. Grinding to remove the corners is permitted, but care must be taken to avoid overheating the elongated spring member to minimize the tendency of the elongated spring member to crack. Note that grinding is specifically avoided when forming the integral eye 13 or the mounting holes so that structural weakness at those locations is prevented.

After machining, the elongated spring member is shot-peened per MIL-S-13165 (current as of May 15, 1991), using hard steel shot (Rockwell-C hardness 55–65) with a shot size of 280, step 112. The shot intensity should be about 0.016 with 200% coverage. While the internal diameter of the integral eye is specifically not shot-peened, special care is taken to ensure complete peening of all other corners and radii. The manufacturing process is then completed, step 114, except for painting and assembly.

Although a specific embodiment of the present invention has been described herein for purposes of illustration, various modifications may be made without deviating from the spirit and scope of the present invention.

I claim:

1. A method of forming an elongated spring member comprising the steps of:
   procuring a blank of spring steel;
   cutting a base elongated spring member from the blank;
   forming a closed integral eye through the base elongated spring member;
   heat treating the base elongated spring member;
   machining the base elongated spring member to the dimensions of the elongated spring member; and
   shot peening the elongated spring member.

2. A method according to claim 1 wherein the step of cutting is performed using plasma arc techniques.

3. The method according to claim 2 wherein the step of forming the integral eye includes the step of burning through the base elongated spring member using plasma arc techniques.

4. The method according to claim 2 wherein the step of heat treating the base elongated spring member includes the step of:

soaking the base elongated spring member at an elevated temperature to relieve stress.

5. The method according to claim 3 wherein the step of forming the integral eye includes the step of drilling through the base elongated spring member.

6. The method according to claim 4 wherein the step of heat treating the base elongated spring member includes strengthening the base elongated spring member by heating, quenching, and tempering.

7. A method of forming an elongated spring member comprising the steps of:

procuring a blank of spring steel;

cutting a base elongated spring member from the blank;

forming a closed integral eye through the base elongated spring member; and shaping the base elongated spring member to the dimensions of the elongated spring member.

8. The method according to claim 7 wherein the step of cutting is performed using plasma arc techniques.

9. The method according to claim 7 wherein the step of forming the integral eye includes the step of burning through the base elongated spring member using plasma arc techniques.

10. The method according to claim 7 further including heat treating the base elongated spring member.

11. The method according to claim 10 wherein the step of heat treating the base elongated spring member includes the step of:

soaking the base elongated spring member at an elevated temperature to relieve stress.

12. The method according to claim 10 wherein the step of heat treating the base elongated spring member includes the step of:

strengthening the base elongated spring member by heating, quenching, and tempering.

13. The method according to claim 7 wherein the step of forming the integral eye includes the step of drilling through the base elongated spring member.

14. The method according to claim 7 further including shot peening the elongated spring member.

* * * * *